US011841989B2

(12) United States Patent
Liang et al.

(10) Patent No.: US 11,841,989 B2
(45) Date of Patent: Dec. 12, 2023

(54) METHOD, DEVICE, AND STORAGE MEDIUM FOR GENERATING A HAPTIC FEEDBACK

(71) Applicant: BEIJING XIAOMI MOBILE SOFTWARE CO., LTD., Beijing (CN)

(72) Inventors: Zhe Liang, Beijing (CN); Qiaozhuo Chen, Beijing (CN); Huiying Yang, Beijing (CN); Fan Jin, Beijing (CN); Wenwen Li, Beijing (CN); Yuefeng Ma, Beijing (CN); Yixin Zhao, Beijing (CN); Rong Liu, Beijing (CN); Liang Xuan, Beijing (CN); Qing Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 14 days.

(21) Appl. No.: 17/334,888

(22) Filed: May 31, 2021

(65) Prior Publication Data
US 2022/0206578 A1 Jun. 30, 2022

(30) Foreign Application Priority Data
Dec. 28, 2020 (CN) .......................... 202011579296.9

(51) Int. Cl.
*G06F 3/01* (2006.01)
*G06F 3/0488* (2022.01)
*G09B 21/00* (2006.01)

(52) U.S. Cl.
CPC ............ *G06F 3/016* (2013.01); *G06F 3/0488* (2013.01); *G09B 21/003* (2013.01)

(58) Field of Classification Search
CPC ............................... G06F 3/016; G06F 3/0488
See application file for complete search history.

(56) References Cited

U.S. PATENT DOCUMENTS 8,378,979 B2 * 2/2013 Frid ................... G06F 15/0291
  345/173
9,690,382 B1 * 6/2017 Moussette ............... G06F 3/167
(Continued)

FOREIGN PATENT DOCUMENTS

EP          2733576 A1     5/2014

OTHER PUBLICATIONS

Nishino et al., "A Touch Screen Interface Design with Tactile Feedback", 2011, IEEE, International Conference on Complex, Intelligent, and Software Intensive Systems, pp. 53-60 (Year: 2011).*
(Continued)

*Primary Examiner* — Nicholas Klicos
(74) *Attorney, Agent, or Firm* — SYNCODA LLC; Feng Ma

(57) ABSTRACT

A method for generating a haptic feedback can be applied to a terminal, and include: in response to an interface element on a display interface of the terminal being touched, determining a first interface element type corresponding to the interface element, and determining a first haptic effect corresponding to the first interface element type based on a matchup between interface element types and haptic effects, where different interface element types correspond to different haptic effects; generating a haptic feedback of the first haptic effect.

11 Claims, 8 Drawing Sheets

(56) References Cited

U.S. PATENT DOCUMENTS

| | | | | |
|---|---|---|---|---|
| 2003/0080987 | A1* | 5/2003 | Rosenberg | G06F 3/011 715/701 |
| 2005/0231489 | A1* | 10/2005 | Ladouceur | G06F 3/0482 345/157 |
| 2007/0057913 | A1* | 3/2007 | Eid | G06F 3/016 345/156 |
| 2010/0004033 | A1* | 1/2010 | Choe | H04M 1/724 455/567 |
| 2010/0188327 | A1* | 7/2010 | Frid | G06F 3/016 340/407.2 |
| 2011/0061017 | A1* | 3/2011 | Ullrich | G06F 3/0237 715/702 |
| 2011/0289402 | A1* | 11/2011 | Hiitola | G06F 3/016 715/234 |
| 2012/0268412 | A1 | 10/2012 | Cruz-Hernandez et al. | |
| 2012/0286944 | A1* | 11/2012 | Forutanpour | G06F 3/016 340/407.1 |
| 2014/0049491 | A1* | 2/2014 | Nagar | G06F 3/016 345/173 |
| 2015/0070269 | A1* | 3/2015 | Bhatia | G06F 3/016 345/156 |
| 2015/0332107 | A1* | 11/2015 | Paniaras | G06F 3/016 715/765 |
| 2016/0018891 | A1* | 1/2016 | Levesque | H05K 999/99 345/174 |
| 2017/0358181 | A1 | 12/2017 | Moussette et al. | |
| 2018/0107276 | A1* | 4/2018 | Heubel | G06F 3/011 |
| 2019/0121500 | A1 | 4/2019 | Liddell | |
| 2019/0182371 | A1* | 6/2019 | Ashall | H04M 1/72469 |

OTHER PUBLICATIONS

Hemmert et al., "Tactful Calling: Urgency-Augmented Phone Calls through High-Resolution Pressure Input on Mobile Phones", Apr. 2009, Conference on Human Factors in Computing Systems (CHI), pp. 3187-3192 (Year: 2009).*

Learn about TalkBack settings—Android Accessibility Help, May 18, 2021 https://support.google.com/accessibility/android/answer/6006589?hl=en&ref_topic=3529932.

Extended European Search Report in Application No. 21181180.7, dated Dec. 17, 2021.

* cited by examiner

METHOD, DEVICE, AND STORAGE MEDIUM FOR GENERATING A HAPTIC FEEDBACK

CROSS-REFERENCE TO RELATED APPLICATIONS

This application claims priority to Chinese Patent Application No. 202011579296.9 filed on Dec. 28, 2020, the disclosure of which is hereby incorporated by reference in its entirety.

BACKGROUND

With the development of accessibility technologies, more users, including those with disabilities, can use smart terminal device, particularly assistive devices. For example, visually-impaired users may use a terminal with the help of a screen reading software.

SUMMARY

The present disclosure provides a method and device for generating a haptic feedback, and a storage medium.

A first aspect of embodiments of the present disclosure provides a method for generating a haptic feedback. The method is applied to a terminal and includes: in response to an interface element on a display interface of the terminal being touched, determining a first interface element type corresponding to the interface element; determining, based on a matchup between interface element types and haptic effects, a first haptic effect corresponding to the first interface element type, where different interface element types correspond to different haptic effect; and generating a haptic feedback of the first haptic effect.

A second aspect of embodiments of the present disclosure provides a device for generating a haptic feedback. The device is applied to a terminal and includes: a processing unit, configured to: in response to an interface element on a display interface of the terminal being touched, determine a first interface element type corresponding to the interface element, and determine a first haptic effect corresponding to the first interface element type based on a matchup between interface element types and haptic effects, where different interface element types correspond to different haptic effects; and a haptic feedback unit, configured to generate a haptic feedback of the first haptic effect.

A third aspect of embodiments of the present disclosure provides a device for generating a haptic feedback, including: a processor; and a memory storing executable by the processor, where the processor is configured to call the instructions to execute the method for generating a haptic feedback according to the first aspect or any implement of the first aspect of the present disclosure.

A fourth aspect of embodiments of the present disclosure provides a non-transitory computer-readable storage medium, where instructions in the storage medium that, when executed by a processor of a mobile terminal, cause the mobile terminal to execute the method for generating a haptic feedback according to the first aspect or any implement of the first aspect of the present disclosure.

It should be understood that the above general description and detailed description described hereinafter are only exemplary and explanatory, and not intended to limit the present disclosure.

BRIEF DESCRIPTION OF THE DRAWINGS

The drawings herein are incorporated into the specification and constitute a part of the disclosure, show embodiments that conform to the disclosure, and together with the specification are used to explain the principle of the disclosure.

DETAILED DESCRIPTION

Figure 1:
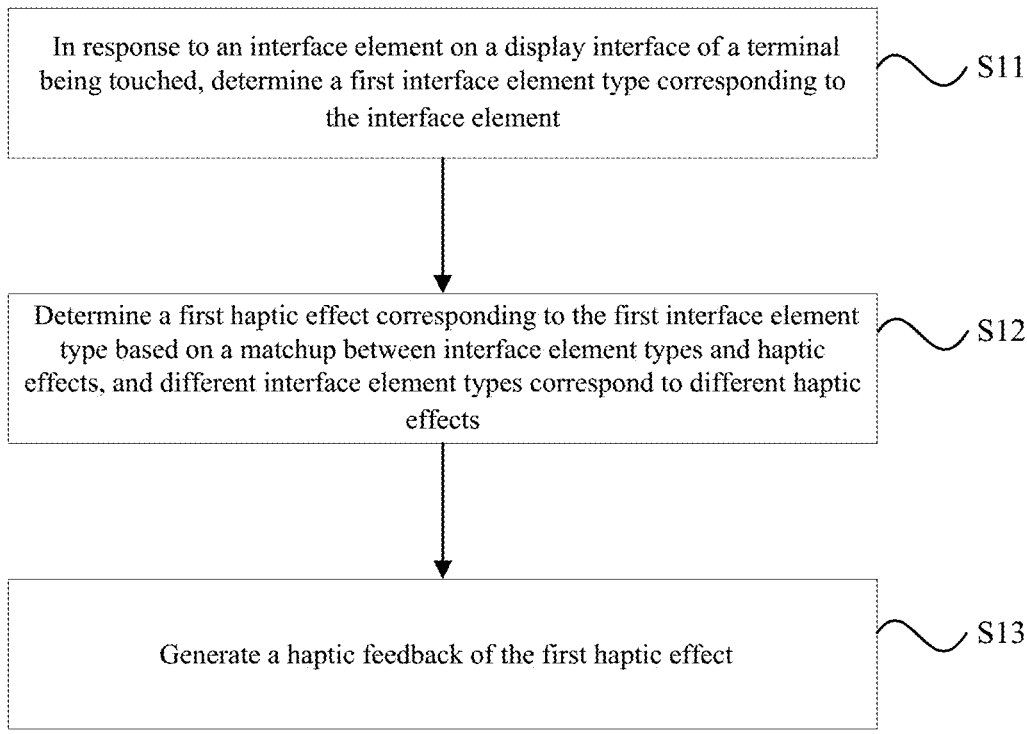
FIG. 1 is a flowchart showing a method for generating a haptic feedback according to some embodiments.

The exemplary embodiments will be described in detail here, and examples thereof are shown in the accompanying drawings. When the following description refers to the drawings, unless otherwise indicated, the same numbers in different drawings indicate same or similar elements. The implementation manners described in the following exemplary embodiments do not represent all implementation manners consistent with the present disclosure. On the contrary, they are merely examples of devices and methods consistent with some aspects of the present disclosure as recited in the appended claims.

In the drawings, same or similar reference numerals indicate same or similar elements or elements with same or similar functions. The described embodiments are a part of the embodiments of the present disclosure, but not all of the embodiments. The embodiments described below with reference to the drawings are exemplary, and are intended to explain the present disclosure, but should not be construed as limiting the present disclosure. All other embodiments that are obtained by those ordinary skilled in the art based on the embodiments in the present disclosure without paying creative work shall fall within the protection scope of the present disclosure. The embodiments of the present disclosure will be described in detail below with reference to the accompanying drawings. It should be noted that unless specifically stated otherwise, the relative arrangement of components, numerical expressions, and numerical values set forth in these embodiments do not limit the scope of the present disclosure.

For visually-impaired users, a screen reading software may be used to help them use the terminal. However, current screen reading software generally generates a voice and a single vibration sense corresponding to the touched item to help visually-impaired users use the terminal. For places where it is inconvenient to activate the voice function, the visually-impaired users cannot effectively distinguish the control being touched because the screen reading software provides the same vibration sense to all controls in the application scenario.

According to the method for generating a haptic feedback provided by the present disclosure, a haptic feedback matching an interface element being touched is generated by: determining an interface element type corresponding to the interface element being touched on a display interface of the terminal, and determining haptic effect corresponding to the interface element being touched based on a matchup between interface element types and haptic effects. Different interface elements correspond to different haptic feedbacks. Therefore, the user is ensured to determine the interface element being currently touched based on the haptic feedback.

The method for generating a haptic feedback provided by the embodiment of the present disclosure may be applied to a terminal. The terminal may have a touch screen. For example, the terminal may include a smart mobile terminal with a touch screen, and may also include a tablet computer with a touch screen. In the present disclosure, the terminal is not specifically limited.

FIG. 1 is a flowchart of a method for generating a haptic feedback according to some embodiments.

In some embodiments of the present disclosure, as shown in FIG. 1, the method for generating a haptic feedback includes the following steps.

In step S11, in response to an interface element on a display interface of the terminal being touched, a first interface element type corresponding to the interface element is determined.

In an embodiment, when an interface element on the display interface of the terminal is touched, the interface element type corresponding to the touched interface element can be determined, which is referred to as the first interface element type hereinafter.

It should be understood that if the first interface element type corresponding to the interface element being touched is an interface element type preset with a specific haptic effect, the haptic effect corresponding to the interface element type can be generated when the interface element is touched.

The interface elements may include elements such as applications, buttons, switches, sliders, specific texts, etc. displayed on the display interface of the terminal.

In step S12, a first haptic effect corresponding to the first interface element type is determined based on a matchup between interface element types and haptic effects. Among them, different interface element types correspond to different haptic effects.

In an embodiment, different interface element types can be preset to correspond to different haptic effects. For example, an answer button interface element for a terminal incoming call may correspond to a haptic effect of a first vibration sense level. A hang-up button interface element for the terminal incoming call may correspond to a haptic effect of a second vibration sense level. During the application process, the first haptic effect corresponding to the first interface element type may be determined based on a preconfigured matchup between the interface element types and the haptic effects.

In step S13, a haptic feedback of the first haptic effect is generated.

In an embodiment, different haptic effects may correspond to different haptic feedbacks. The matchup between the haptic effects and the haptic feedbacks can be determined in advance. In an example, the interface element being touched on the current display interface of the terminal is an unread message list in a communication chat software, the haptic effect corresponding to the interface element being touched on the current display interface of the terminal is determined as a haptic effect of a third vibration sense level based on the matchup between the interface element types and the haptic effects. Further, when the unread message list in the communication chat software is touched, a haptic feedback matching the haptic effect of the third vibration level can be generated for the user.

According to the method for generating a haptic feedback provided by the present disclosure, the haptic feedback matching the first haptic effect is generated by: determining the first interface element type corresponding to the interface element being touched on the display interface of the terminal, and determining the first haptic effect corresponding to the first interface element type based on the matchup between the interface element types and the haptic effects. Since different interface elements correspond to different haptic feedbacks, the user is ensured to determine the interface element being currently touched based on the haptic feedback.

The manner for determining the matchup between the interface element types and the haptic effects will be illustrated through the following embodiments in the present disclosure.

Figure 2:
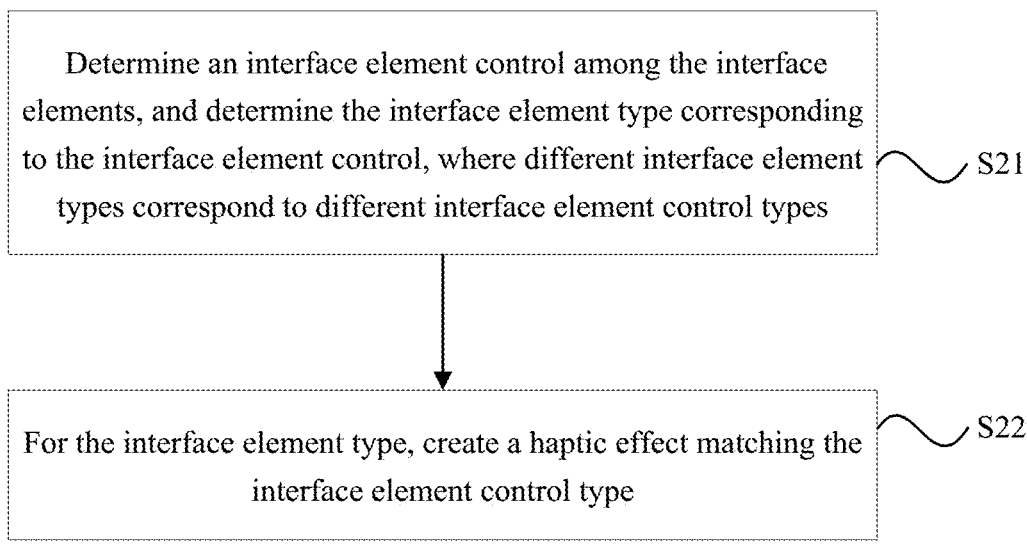
FIG. 2 is a flow chart of determining the correspondence between interface element types and haptic effects.

FIG. 2 is a flow chart of determining the matchup between interface element types and haptic effects.

In some embodiments of the present disclosure, as shown in FIG. 2, the matchup between the interface element types and the haptic effects is determined through step S21 and step S22. These steps will be described respectively below.

In step S21, an interface element control is determined among the interface elements, and the interface element type corresponding to the interface element control is determined, where different interface element types correspond to different interface element control types. It should be understood that the interface element control types include at least one of the following: a text list, a button, a switch, and a slider.

In an embodiment, the interface elements may include the interface element control. The interface element control may include one or more of a text list, a button, a switch, and a slider. In the application process, the interface element control can be determined among the interface elements, and the interface element types corresponding to the interface element controls can be determined, and different interface element types correspond to different interface element control types.

In step S22, for the interface element type, a haptic effect matching the interface element control type is created.

In an embodiment, the haptic effect matching the interface element control type may be pre-created based on the interface element type. Furthermore, a corresponding touch effect is generated for the user when the interface element control is touched, which is convenient for the user to determine what kind of interface element controls the interface element control is.

In an example, the interface element control may be an unread message list in a communication chat application, and the unread message list in the communication chat application corresponds to the first interface element type. In another example, the interface element control may be a read message list in the communication chat application, and the read message list in the communication chat application corresponds to the second interface element type. In the application process, a haptic effect matching the unread message list in the communication chat application can be created, based on the first interface element type, in advance. It is also possible to create, based on the second interface element type, a haptic effect matching the read message list in the communication chat application in advance.

In some embodiments of the present disclosure, the haptic effect matching the interface element control type can be created in the following manner.

In response to different control operation attributes included in the same interface element control type, different haptic effects are created for different control operation attributes.

The control operation attributes can represent different processing methods of the control operation. Taking the communication chat application control as an example, the message list in the communication chat application may be displayed as including an unread message list and a read message list. It should be understood that the unread message list and the read message list displayed in the message list are different control operation attributes of the communication chat application control. Further, corresponding haptic effects can be created for the unread message list and the read message list respectively. When the user touches the unread message list or the read message list, corresponding haptic feedback can be provided to the user to give a clue that the currently touched interface element control is the unread message list or the read message list.

In another embodiment, there may include two control operation attributes (that is, answering calls and rejecting calls) for a terminal incoming call. Further, corresponding haptic effects can be created for answering calls and rejecting calls respectively. When the user touches an interface element control for answering calls or an interface element control for rejecting calls, the corresponding haptic feedback can be provided to the user to give a clue that the interface element control currently touched is the interface element control for answering calls or the interface element control for rejecting calls.

The process of creating different haptic effects for different control operation attributes will be described through the following embodiments of the present disclosure.

In some embodiments of the present disclosure, different control operation attributes include emphasized control operations and normal control operations, and an emphasized haptic effect may be created for the emphasized control operation, and a normal haptic effect may be created for the normal control operation.

In the application process, there are generally more than two control operation attributes for the same interface element control type. Among the multiple control operation attributes, the terminal recommends a certain control operation attribute to be operated by the user. Such type of control operation attribute can be referred to as the emphasized control operation attribute. In an example, control operation attributes other than the emphasized control operation attributes may be referred to as normal control operation attributes.

In an embodiment, in the communication chat application control, the control operation attribute of the unread message list is the control operation attribute that is recommended by the terminal for the user to operate. Therefore, the control operation attribute of the unread message list can be used as the emphasized control operation attribute. Accordingly, the control operation attribute of the read message list can be used as the normal control operation attribute.

In another embodiment, in the terminal incoming call control, the control operation attribute for answering calls is the control operation attribute that the terminal recommends the user to operate. Therefore, the control operation attribute for answering calls can be used as the emphasized control operation attribute. Accordingly, the control operation attribute for rejecting calls can be regarded as the normal control operation attribute.

Further, it is possible to create an emphasized haptic effect for emphasized control operations, and create a normal haptic effect for normal control operations. In an embodiment, the emphasized haptic effect corresponding to the emphasized control operation may be a vibration with a higher vibration level, and the normal haptic effect corresponding to the normal control operation may be a vibration with a weaker vibration level.

In order to further explain the method for generating a haptic feedback according to the embodiments of the present disclosure, scenarios where the method for generating a haptic feedback of the embodiments of the present disclosure is applied are described through the following embodiments.

It should be understood that the method for generating a haptic feedback described in the embodiments of the present disclosure can be applied to a scenario where a smart terminal is used by visually-impaired users. In an example, corresponding haptic effects can be set for the interface element controls commonly used by the visually-impaired users. In this way, when the voice screen reading software cannot be used, the visually-impaired users can directly determine, based on the haptic feedback generated by the terminal, what kind of interface element control is being currently touched.

Figure 3:
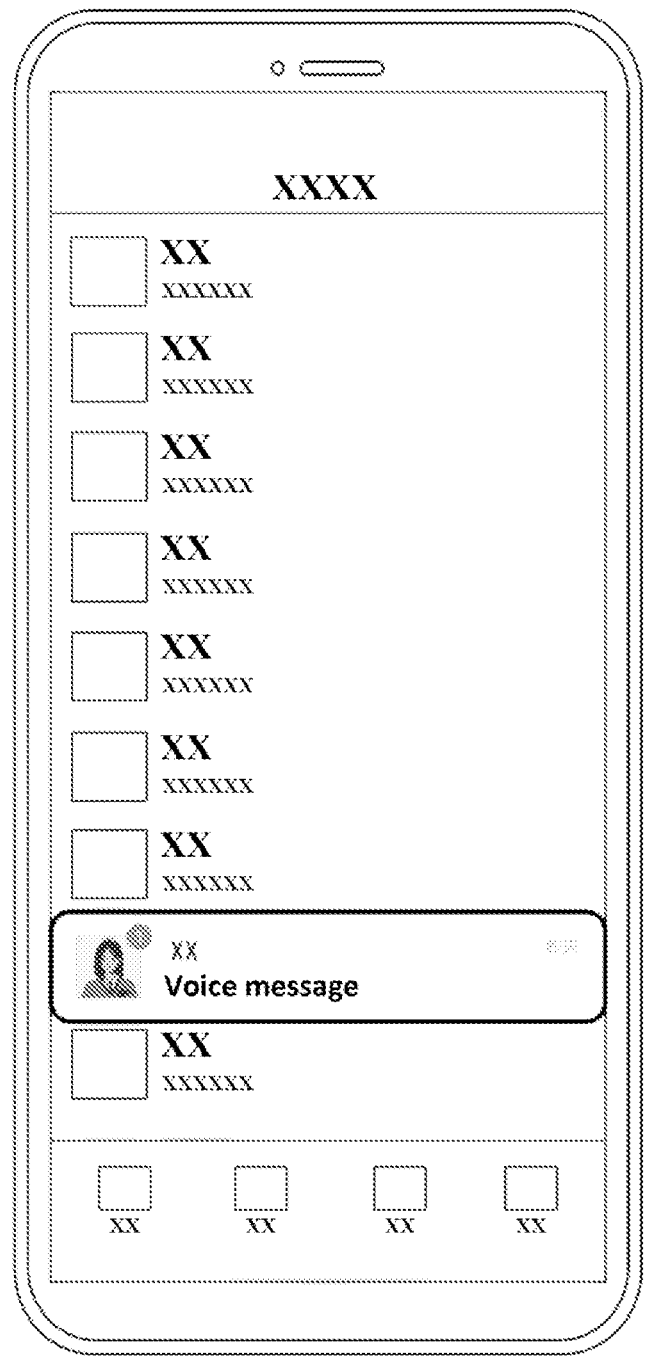
FIG. 3 is a schematic diagram illustrating an application scenario where the method for generating a touch feedback according to an embodiment of the present disclosure is applied.

FIG. 3 is a schematic diagram illustrating an application scenario where the method for generating a touch feedback according to an embodiment of the present disclosure is applied.

In an embodiment of the present disclosure, as shown in FIG. 3, in the communication chat application control, the control operation attribute of the unread message list is the emphasized control operation attribute, and corresponds to the first emphasized haptic effect. If the first haptic feedback matching the first emphasized haptic effect is generated when the user touches the interface elements on the interface displayed by the terminal, it indicates that the interface element currently touched by the user is the unread message list control. In this case, the user can determine, based on his/her current environment, whether to listen to the unread messages displayed in the unread message list control. In the embodiment, once the user touches the unread message list control, the first haptic feedback corresponding to the unread message list control can be generated, thereby ensuring that the user is aware of information about the existence of unread messages in the communication chat software at earliest time possible. Therefore, the user's efficiency for the next operation is improved.

Figure 4:
FIG. 4 is a schematic diagram illustrating another application scenario where the method for generating a touch feedback according to an embodiment of the present disclosure is applied.

FIG. 4 is a schematic diagram illustrating another application scenario where the method for generating a touch feedback according to an embodiment of the present disclosure is applied.

In an embodiment of the present disclosure, as shown in FIG. 4, in the music control, the control operation attribute for controlling the pause/play of the playing music, the control operation attribute for controlling the fast forward of the playing music, the control operation attribute for controlling the rewind of the playing music, and the control operation attribute for turning off playing music can correspond to different haptic effects respectively. In an example, the control operation attribute for turning off the playing music may correspond to the third haptic effect. If a third haptic feedback matching the third haptic effect is generated when the user touches the interface element on the display interface of the terminal, it indicates that the interface element currently touched by the user is the operation control that controls the playing music to be turned off. In this case, the user can determine, based on his/her current environment, whether to turn off the currently playing music.

Figure 5:
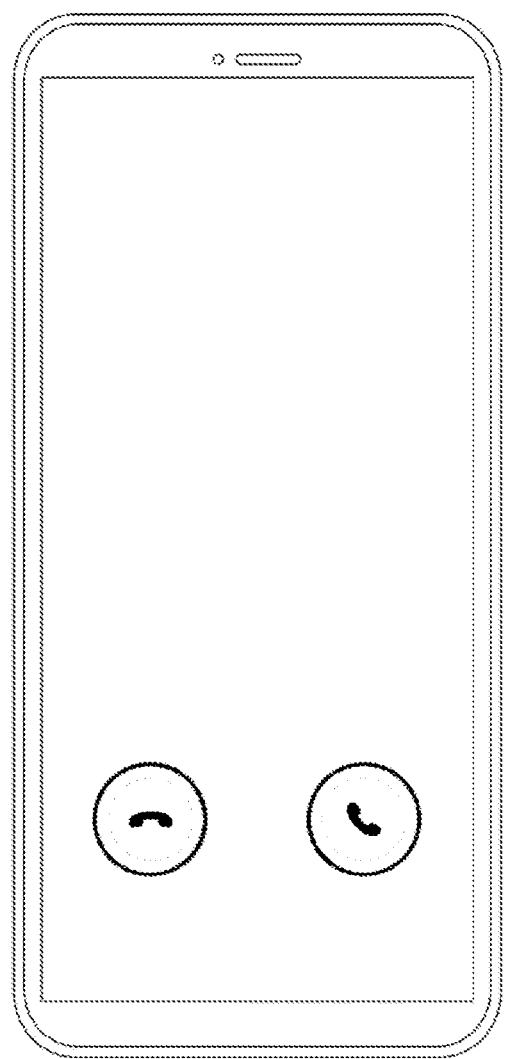
FIG. 5 is a schematic diagram illustrating another application scenario where the method for generating a touch feedback according to an embodiment of the present disclosure is applied.

FIG. 5 is a schematic diagram illustrating another application scenario where the method for generating a touch feedback according to an embodiment of the present disclosure is applied.

In an embodiment of the present disclosure, as shown in FIG. 5, in the terminal incoming call control, the operation attribute for answering calls is the emphasized control operation attribute, and corresponds to the first emphasized haptic effect. If the first haptic feedback matching the first emphasized haptic effect is generated when the user touches the interface element on the display interface on the terminal, it indicates that the interface element currently touched by the user is the operation control for answering calls, and the user can determine, based on his/her current environment, whether to answer the call of the terminal. In another example, the operation attribute for rejecting calls is the normal control operation attribute, and corresponds to a second emphasized haptic effect. If the second haptic feedback matching the second emphasized haptic effect is generated when the user touches the interface element on the display interface on the terminal, it indicates that the interface element currently touched by the user is the operation control for rejecting calls, and the user can determine, based on his/her current environment, whether to reject the call of the terminal.

Figure 6:
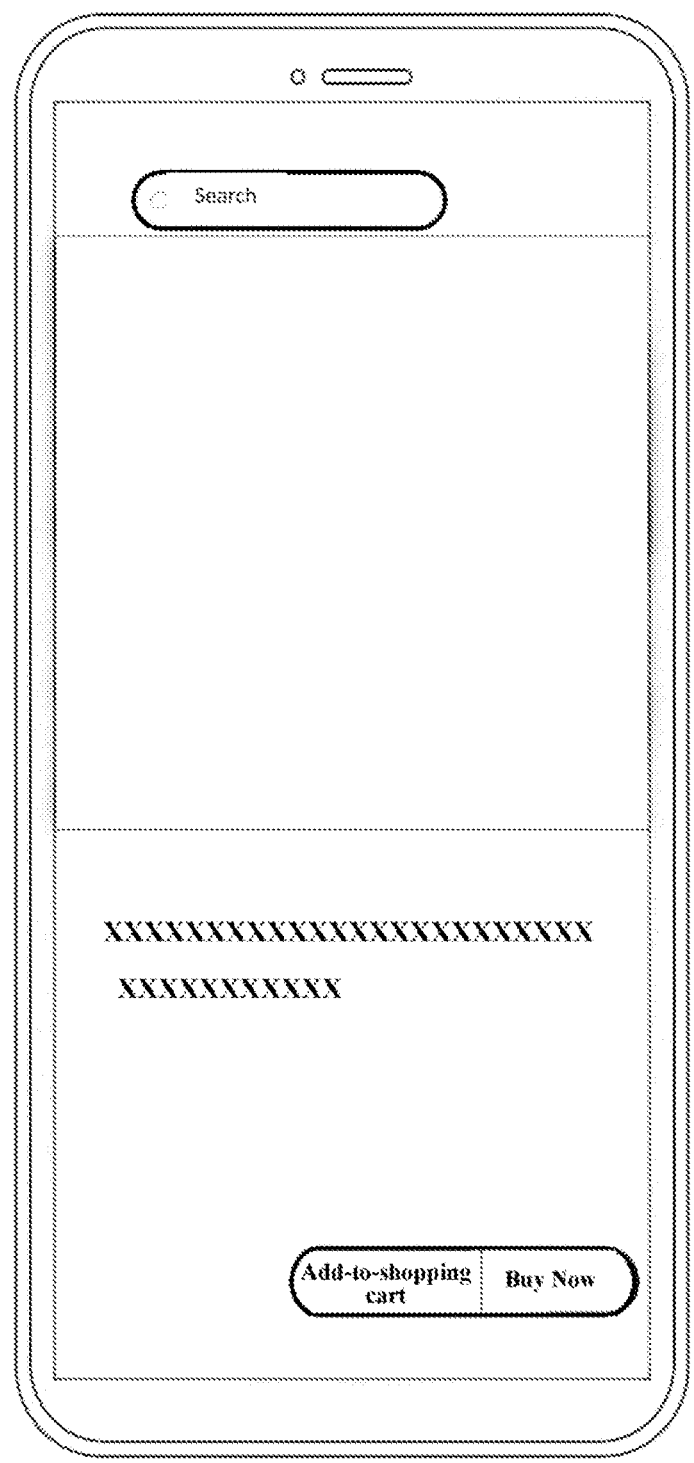
FIG. 6 is a schematic diagram illustrating yet another application scenario where the method for generating a touch feedback according to an embodiment of the present disclosure is applied.

FIG. 6 is a schematic diagram illustrating an application scenario where the method for generating a touch feedback according to an embodiment of the present disclosure is applied.

In an embodiment of the present disclosure, as shown in FIG. 6, in the shopping application controls, the operation attribute of the search box control, the operation attribute of the add-to-shopping cart control, and the operation attribute of the buy-now control can respectively correspond to different haptic effects. In an example, the operation attribute of the buy-now control may correspond to the first haptic effect. If the first haptic feedback matching the first haptic effect is generated when the user touches the interface element on the display interface of the terminal, it indicates that the interface element currently touched by the user is the buy-now operation control in the shopping application controls. The user can determine whether to buy the currently selected commodity according to his/her own needs.

As can be seen from the above embodiments, a haptic feedback corresponding to the interface element can be generated once the user touches the interface element. Therefore, in the case that the current interface elements cannot be read in voices, the user is ensured to know what kind of interface elements is currently touched at earliest time possible, thereby improving the operation efficiency of the user in the next step.

The process of generating a haptic feedback matching the first haptic effect will be described through the following embodiments of the present disclosure.

Figure 7:
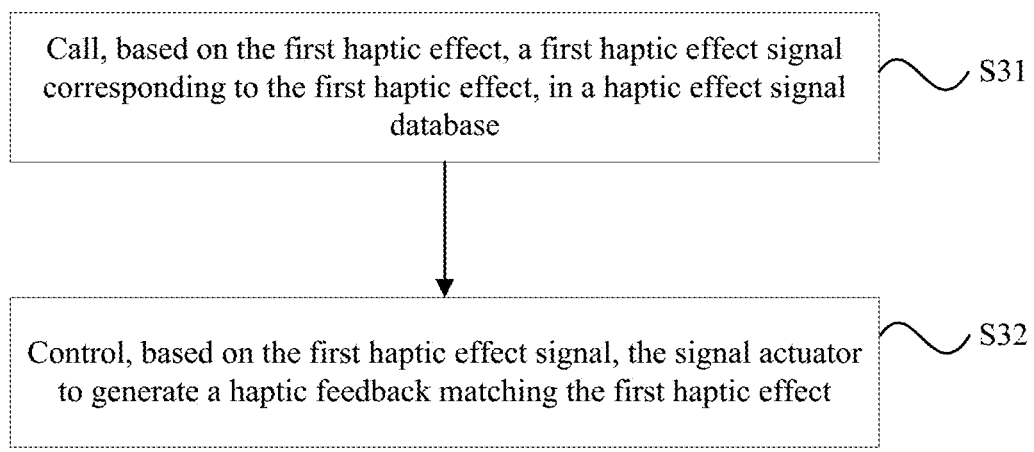
FIG. 7 shows a flow chart of generating a haptic feedback matching a first haptic effect.

FIG. 7 shows a flow chart of generating a haptic feedback matching the first haptic effect.

In some embodiments of the present disclosure, the terminal includes a signal actuator. In an example, the signal actuator may be a linear motor for generating vibration. As shown in FIG. 7, the process of generating a haptic feedback matching the first haptic effect includes step S31 and step S32, and each step will be introduced separately below.

In step S31, a first haptic effect signal corresponding to the first haptic effect is called, based on the first haptic effect, in a haptic effect signal database.

In step S32, the signal actuator is controlled, based on the first haptic effect signal, to generate a haptic feedback matching the first haptic effect.

In an embodiment, the haptic effect signal database includes a matchup table of haptic effects and haptic effect signals. Based on the haptic effect signal database, the first haptic effect signal corresponding to the first haptic effect can be determined and called.

Further, the signal actuator may be controlled based on the first haptic effect signal to generate a haptic feedback matching the first haptic effect at the terminal. The signal actuator can be a linear motor. It should be understood that different haptic effects correspond to different haptic effect signals. Different haptic effect signals can be used by the signal actuator to generate different haptic feedback at the terminal.

The process of another method for generating a haptic feedback will be described through the following embodiments of the present disclosure.

Figure 8:
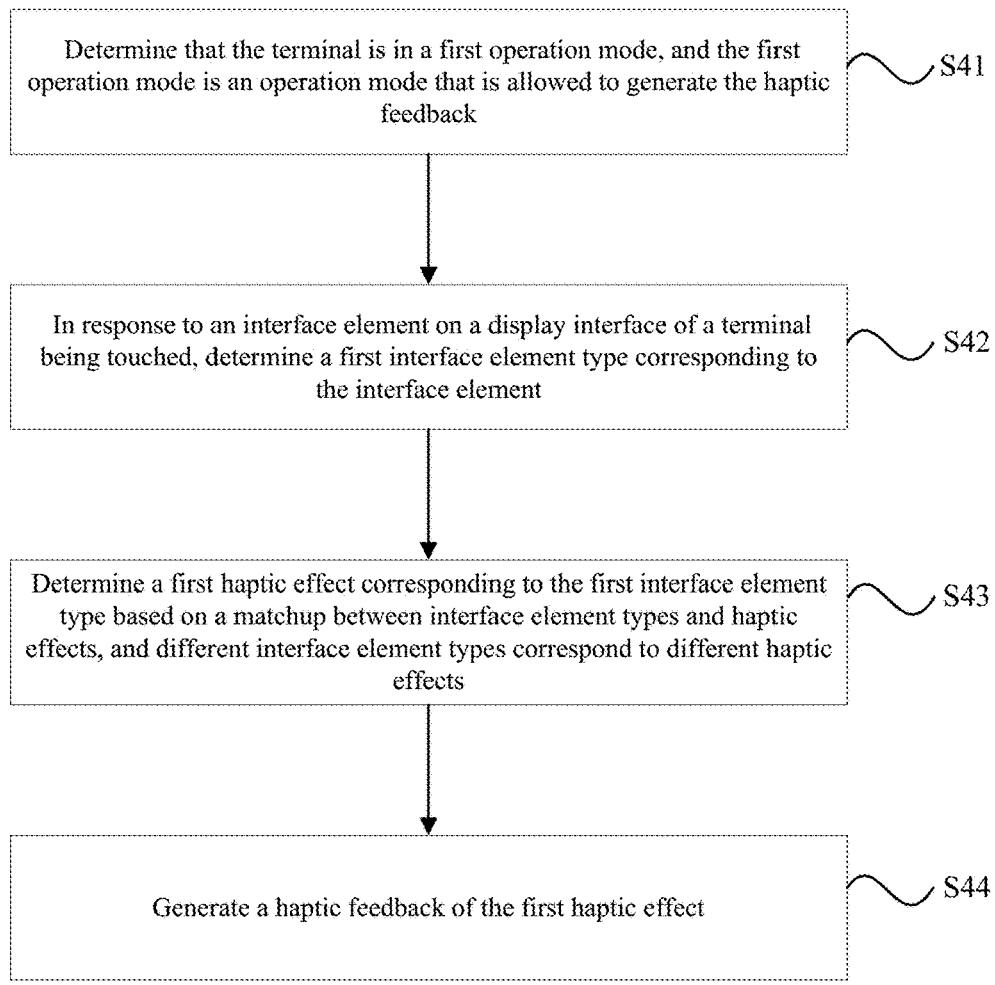
FIG. 8 is a flowchart of another method for generating a haptic feedback according to some embodiments.

In some embodiments of the present disclosure, as shown in FIG. 8, the method for generating a haptic feedback may include steps S41 to S44, where steps S42 to S44 are the same as steps S11 to S13 described above. The specific steps and the beneficial effects of these steps will not be repeated in this embodiment, please refer to the preceding text for details. Step S41 will be described in detail below.

In step S41, it is determined that the terminal is in a first operation mode, and the first operation mode is an operation mode that is allowed to generate the haptic feedback.

In an embodiment, the first operation mode that is allowed to generate the haptic feedback may be a focus screen reading mode. It should be understood that the method for generating the haptic feedback can be applied to a scenario where the terminal is in the focus screen reading mode. In the focus screen reading mode, the touched item can be read by voice to help the user know what kind of control is currently touched. However, in the focus screen reading mode, the same vibration is generated for all the touched items, thus failing to help the user to determine what kind of control is currently touched through the touch feedback.

In order to enable the user to determine, based on the touch feedback, what kind of control is currently being touched, in response to determining that the interface element on the display interface of the terminal is being touched, the first interface element type corresponding to the interface element can be determined, the first haptic effect corresponding to the first interface element type is determined based on the matchup between the interface element types and the haptic effects, and the haptic feedback matching the first haptic effect is generated based on the first haptic effect. According to the embodiment, the user is ensured to determine which interface element is currently being touched based on the haptic feedback.

According to the above description, the method for generating a haptic feedback of the present disclosure determines the first interface element type corresponding to the touched interface element on the display interface of the terminal, and determines, based on the matchup between the interface element types and the haptic effects, the first haptic effect corresponding to the first interface element type, to generate the haptic feedback matching the first haptic effect. Since different interface elements correspond to different haptic feedbacks, the user is ensured to determine which interface element is currently being touched based on the haptic feedback.

Based on the same concept, the embodiments of the present disclosure further provide a device for generating a haptic feedback.

It can be understood that, in order to realize the above-mentioned functions, the device for generating a haptic feedback provided in the embodiments of the present disclosure includes corresponding hardware structures and/or software modules used for performing each function. In combination with the units and algorithm steps of the examples disclosed in the embodiments of the present disclosure, the embodiments of the present disclosure can be implemented in the form of hardware or a combination of hardware and computer software. Whether a certain function is executed by hardware or a combination of hardware and computer software depends on the specific application and design constraint conditions of the technical solution. Those skilled in the art can use different methods for each specific application to implement the described functions, but such implementation should not be considered as going beyond the scope of the technical solutions of the embodiments of the present disclosure.

Figure 9:
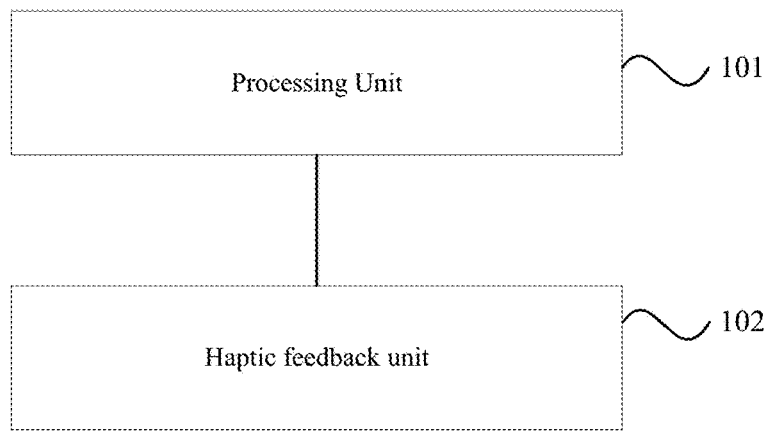
FIG. 9 is a block diagram showing a device for generating a haptic feedback according to some embodiments.

FIG. 9 is a block diagram showing a device for generating a haptic feedback according to some embodiments.

In some embodiments of the present disclosure, as shown in FIG. 9, the device for generating a haptic feedback may include a processing unit 101 and a haptic feedback unit 102. Each module will be introduced separately below.

The processing unit 101 may be configured to: in response to an interface element on a display interface of the terminal being touched, determine a first interface element type corresponding to the interface element.

The processing unit 101 may be configured to: determine, based on a matchup between interface element types and haptic effects, a first haptic effect corresponding to the first interface element type, where different interface element types correspond to different haptic effects.

The haptic feedback unit 102 may be configured to: generate a haptic feedback of the first haptic effect.

In some embodiments of the present disclosure, the processing unit 101 may preconfigure the matchup between the interface element types and the haptic effects through the following methods: determining an interface element control among the interface elements, and determining the interface element type corresponding to the interface element control, where different interface element types correspond to different interface element control types, the interface element control types include at least one of a text list, a button, a switch, and a slider; for the interface element type, creating a haptic effect matching the interface element control type.

In some embodiments of the present disclosure, the processing unit 101 may use the following method to create the haptic effect matching the interface element control type: in response to determining that the same interface element control type includes different control operation attributes, creating different haptic effects for different control operation attributes.

In some embodiments of the present disclosure, the processing unit 101 may use the following method to create different haptic effects for different control operation attributes: different control operation attributes include emphasized control operations and normal control operations, and an emphasized haptic effect is created for the emphasized control operation, and a normal haptic effect is created for the normal control operation.

In some embodiments of the present disclosure, the terminal includes a signal actuator, and the haptic feedback unit 102 is configured to generate the haptic feedback matching the first haptic effect in the following manner: calling, based on the first haptic effect, a first haptic effect signal corresponding to the first haptic effect in a haptic effect signal database; controlling, based on the first haptic effect signal, the signal actuator to generate the haptic feedback matching the first haptic effect.

In some embodiments of the present disclosure, the processing unit 101 may further be configured to: determine that the terminal is in a first operation mode, where the first operation mode is an operation mode that is allowed to generate the haptic feedback.

As for the device provided in the foregoing embodiment, the specific manner in which each module performs the operation has been described in detail in the method embodiment, and detailed description will not be given here.

Figure 10:
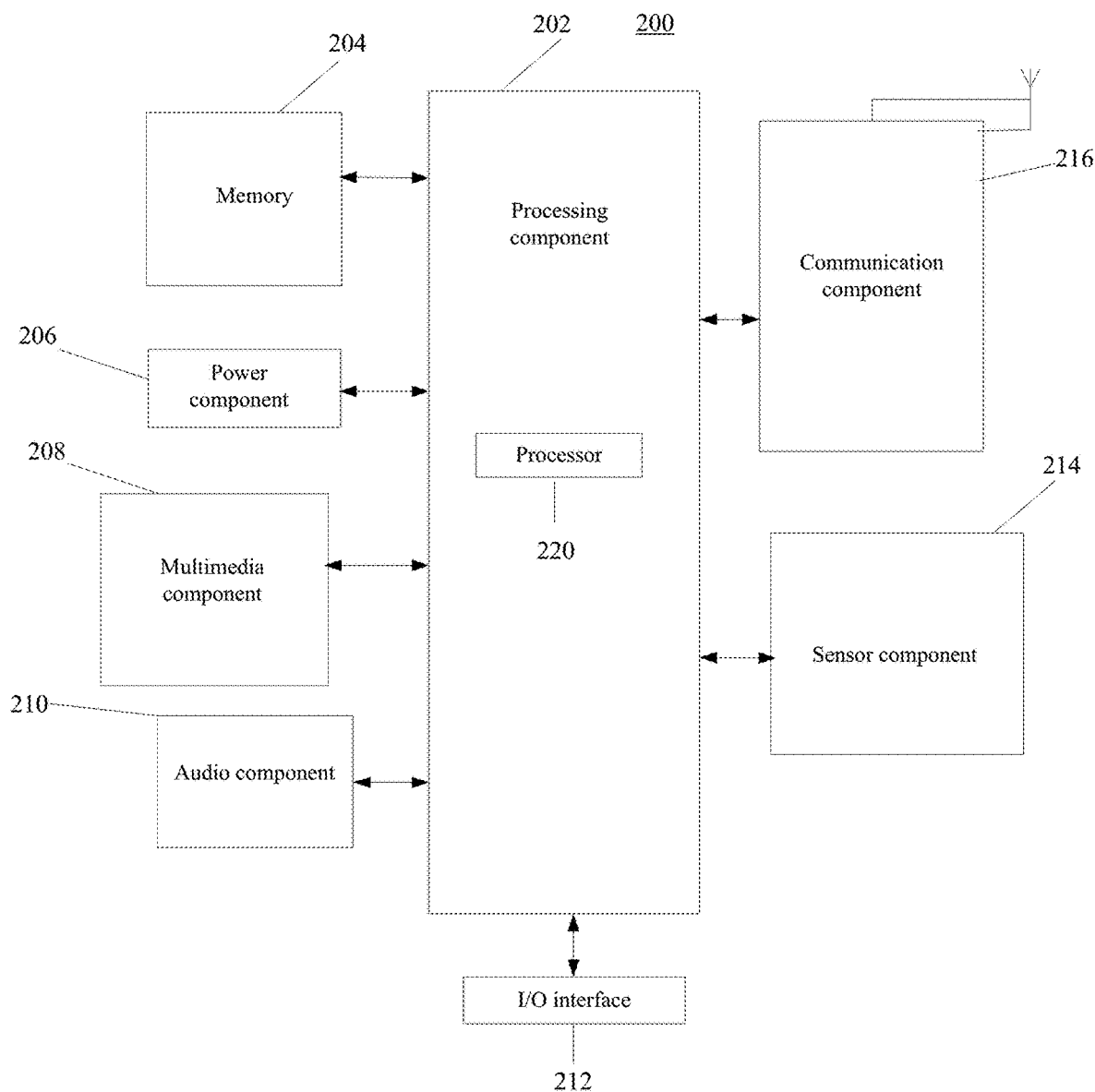
FIG. 10 is a block diagram showing a device for generating a haptic feedback according to some embodiments.

FIG. 10 is a block diagram showing a device for generating a haptic feedback 200 according to some embodiments. For example, the device 200 may be a mobile phone, a computer, a digital broadcasting terminal, a messaging device, a game console, a tablet device, a medical device, a fitness device, a personal digital assistant, etc.

Referring to FIG. 10, the device for generating a haptic feedback 200 may include one or more of the following components: a processing component 202, a memory 204, a power component 206, a multimedia component 208, an audio component 210, an input/output (I/O) interface 212, a sensor component 214, and a communication component 216.

The processing component 202 is generally configured to control the overall operation of the device for generating a haptic feedback 200, such as operations associated with display, telephone calls, data communications, camera operations, and recording operations. The processing component 202 may include one or more processors 220 to execute instructions to perform all or part of the steps of the above-mentioned method for generating a haptic feedback. In addition, the processing component 202 may also include one or more modules to facilitate the interaction between the processing component 202 and other components. For example, the processing component 202 may also include a multimedia module to facilitate the interaction between the multimedia component 208 and the processing component 202.

The memory 204 is configured to store various data to support operations of the device for generating a haptic feedback 200. Examples of the data includes instructions of any application or method that can be run on the device for generating a haptic feedback 200, contact data, phonebook data, messages, pictures and videos and the like. The memory 204 can be implemented by any type of volatile or non-volatile storage device or their combination, such as static random access memory (SRAM), electrically erasable programmable read-only memory (EEPROM), erasable and Programmable read-only memory (EPROM), programmable read-only memory (PROM), read-only memory (ROM), magnetic memory, flash memory, magnetic disk or optical disk.

The power component 206 may supply power to various components of the device for generating a haptic feedback 200. The power component 206 may also include a power management system, one or more power supplies, and other components associated with generating, managing, and distributing power for the device for generating a haptic feedback 200.

The multimedia component 208 may include a screen that provides an output interface between the device for generating a haptic feedback 200 and the user. In some embodiments, the screen may include a liquid crystal display (LCD) and a touch panel (TP). In some embodiments, an organic light-emitting diode (OLED) display can be employed.

If the screen includes a touch panel, the screen may be implemented as a touch screen to receive input signals from the user. The touch panel includes one or more touch sensors to sense touch, sliding, and gestures on the touch panel. The touch sensor may not only sense the boundary of the touch or slide action, but also detect the duration and pressure related to the touch or slide operation. In some embodiments, the multimedia component 208 includes a front camera and/or a rear camera. When the device for generating a haptic feedback 200 is in an operation mode, such as a shooting mode or a video mode, the front camera and/or the rear camera can receive external multimedia data. Each front camera and rear camera can be a fixed optical lens system or have focal length and optical zoom capabilities.

The audio component 210 is configured to output and/or input audio signals. For example, the audio component 210 includes a microphone (MIC), and when the device for generating a haptic feedback 200 is in an operation mode, such as a call mode, a recording mode, and a voice recognition mode, the microphone is configured to receive external audio signals. The received audio signal may be further stored in the memory 204 or transmitted via the communication component 216. In some embodiments, the audio component 210 further includes a speaker for outputting audio signals.

The I/O interface 212 provides an interface between the processing component 202 and a peripheral interface module. The peripheral interface module may be a keyboard, a click wheel, a button, and the like. The button includes but not limits to a home button, a volume button, a start button and a lock button.

The sensor component 214 includes one or more sensors for providing the device for generating a haptic feedback 200 with state evaluation in various aspects. For example, the sensor component 214 can detect the on/off state of the device for generating a haptic feedback 200 and the relative positioning of the components, for example, the component is the display and the keypad of the device for generating a haptic feedback 200. The sensor component 214 can also detect the position change of the device for generating a haptic feedback 200 or a component of the device for generating a haptic feedback 200; detect whether the user contacts the device for generating a haptic feedback 200; detect the orientation or acceleration/deceleration of the device for generating a haptic feedback 200, and the temperature change of the device for generating a haptic feedback 200. The sensor component 214 may include a proximity sensor configured to detect the presence of nearby objects when there is no physical contact. The sensor component 214 may also include a light sensor used for imaging application, such as a complementary metal oxide semiconductor (CMOS) or a charge coupled device (CCD) image sensor. In some embodiments, the sensor component 214 may also include an acceleration sensor, a gyroscope sensor, a magnetic sensor, a pressure sensor or a temperature sensor.

The communication component 216 is configured to facilitate wired or wireless communication between the device for generating a haptic feedback 200 and other devices. The device for generating a haptic feedback 200 can access a wireless network based on a communication standard, such as Wi-Fi, 2G, 3G, 4G, 5G, or a combination thereof. In some embodiments, the communication component 216 receives a broadcast signal or broadcast related information from an external broadcast management system via a broadcast channel. In some embodiments, the communication component 216 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In some embodiments, the device for generating a haptic feedback 200 may be implemented by one or more application specific integrated circuits (ASIC), digital signal processors (DSP), digital signal processing devices (DSPD), programmable logic devices (PLD), field programmable gate array (FPGA), a controller, a microcontroller, a microprocessor, or other electronic components, to execute the foregoing method.

In some embodiments, there is further provided a non-transitory computer-readable storage medium including instructions, such as a memory 204 including instructions, which may be executed by the processor 220 of the device for generating a haptic feedback 200 to complete the foregoing method. For example, the non-transitory computer-readable storage medium may be a ROM, a random-access memory (RAM), a CD-ROM, a magnetic tape, a floppy disk, an optical data storage device, etc.

It can be understood that the terms "plurality" used herein can refer to two or more, and other quantifiers can refer to two or more similarly. The terms "and/or" describes the association relationship of associated objects, indicating that there can be three types of relationships, for example, A and/or B, which can mean: only A, only B, both A and B. The character "/" generally indicates that the former associated object and the latter associated object are in an "or" relationship. The singular forms "a", "said" and "the" are also intended to include plural forms, unless the context clearly indicates other meanings.

It can be further understood that the terms "first", "second", etc. can be used to describe various information, but the information should not be limited to these terms. These terms are only used to distinguish the same type of information from each other, and do not indicate a specific order or degree of importance. In fact, expressions such as "first" and "second" can be used interchangeably. For example, without departing from the scope of the present disclosure, the first information may also be referred to as second information, and similarly, the second information may also be referred to as first information.

In the drawings, same or similar reference numerals indicate same or similar elements or elements with same or similar functions. The described embodiments are a part of the embodiments of the present disclosure, but not all of the embodiments. The embodiments described below with reference to the drawings are exemplary, and are intended to explain the present disclosure, but should not be construed as limiting the present disclosure. All other embodiments that are obtained by those ordinary skilled in the art based on the embodiments in the present disclosure without paying creative work shall fall within the protection scope of the present disclosure. The embodiments of the present disclosure have been described in detail with reference to the accompanying drawings.

The various device components, units, circuits, blocks, or portions may have modular configurations, or are composed of discrete components, but nonetheless may be referred to as "modules," "components" or "circuits" in general. In other words, the components, units, circuits, blocks, or portions referred to herein may or may not be in modular forms.

The various device components, units, blocks, portions, or modules may be realized with hardware, software, or a combination of hardware and software.

In some embodiments of the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms In some embodiments of the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In some embodiments of the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or retracted from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a standalone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HIVID) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims. It can be further understood that, unless otherwise specified, "connection" may include a direct connection between two components without other components being inserted, or an indirect connection between two components with other elements being inserted.

What is claimed is:

1. A method for generating a haptic feedback, applied to a terminal, the method comprising:
creating a matchup between interface element types and haptic effects by:
determining an interface element control among interface elements, and determining interface element type corresponding to the interface element control, wherein different interface element types correspond to different interface element control types, and the interface element control types comprise at least one of: a text list, a button, a switch, and a slider;

in response to determining that a same interface element control type comprises a first type of control operation recommended by the terminal, creating a haptic effect for the first type of control operation;
in response to determining that the same interface element control type comprises a second type of control operation other than the first type, creating a haptic effect for the second type of control operation, wherein the first type of control operation comprises a user touching an unread message list of a communication chat application control, and the second type of control operation comprises the user touching a read message list of the communication chat application control; and a vibration level of the haptic effect corresponding to the first type of control operation is higher than a vibration level of the haptic effect corresponding to the second type of control operation, thereby informing the user of existence of unread messages in a communication chat software at earliest time possible;
in response to an interface element on a display interface of the terminal being touched, determining a first interface element type corresponding to the interface element;
determining, based on the matchup between the interface element types and the haptic effects, a first haptic effect corresponding to the first interface element type, wherein different interface element types correspond to different haptic effects; and
generating a haptic feedback matching the first haptic effect.

2. The method according to claim 1, wherein the terminal comprises a signal actuator, and the generating a haptic feedback matching the first haptic effect comprises:
calling, based on the first haptic effect, a first haptic effect signal corresponding to the first haptic effect in a haptic effect signal database; and
controlling, based on the first haptic effect signal, the signal actuator to generate the haptic feedback matching the first haptic effect.

3. The method according to claim 1, wherein prior to the determining a first interface element type corresponding to the interface element, the method further comprises:
determining that the terminal is in a first operation mode, wherein the first operation mode is an operation mode that is allowed to generate the haptic feedback.

4. A mobile terminal implementing the method according to claim 1, comprising a touch display screen having the display interface.

5. The mobile terminal according to claim 4, wherein the display screen is configured to provide a haptic feedback based on a current interface element being touched.

6. A device for generating a haptic feedback, applied to a terminal and comprising:
a processor; and
a memory for storing instructions executable by the processor,
wherein the processor is configured to execute operations including:
creating a matchup between interface element types and haptic effects by:
determining an interface element control among interface elements, and determining interface element type corresponding to the interface element control, wherein different interface element types correspond to different interface element control types, and the interface element control types comprise at least one of: a text list, a button, a switch, and a slider;
in response to determining that a same interface element control type comprises a first type of control operation recommended by the terminal, creating a haptic effect for the first type of control operation;
in response to determining that the same interface element control type comprises a second type of control operation other than the first type, creating a haptic effect for the second type of control operation, wherein the first type of control operation comprises a user touching an unread message list of a communication chat application control, and the second type of control operation comprises the user touching a read message list of the communication chat application control; and a vibration level of the haptic effect corresponding to the first type of control operation is higher than a vibration level of the haptic effect corresponding to the second type of control operation, thereby informing the user of existence of unread messages in a communication chat software at earliest time possible;
in response to an interface element on a display interface of the terminal being touched, determining a first interface element type corresponding to the interface element;
determining, based on the matchup between the interface element types and the haptic effects, a first haptic effect corresponding to the first interface element type, wherein different interface element types correspond to different haptic effects; and
generating a haptic feedback matching the first haptic effect.

7. The device according to claim 6, wherein the terminal comprises a signal actuator, and the generating a haptic feedback matching the first haptic effect comprises:
calling, based on the first haptic effect, a first haptic effect signal corresponding to the first haptic effect in a haptic effect signal database;
controlling, based on the first haptic effect signal, the signal actuator to generate the haptic feedback matching the first haptic effect.

8. The device according to claim 6, wherein prior to the determining a first interface element type corresponding to the interface element, the processor is further configured to:
determine that the terminal is in a first operation mode, wherein the first operation mode is an operation mode that is allowed to generate the haptic feedback.

9. A non-transitory computer-readable storage medium, wherein instructions in the storage medium that, when executed by a processor of a mobile terminal, cause the mobile terminal to execute operations including:
creating a matchup between interface element types and haptic effects by:
determining an interface element control among interface elements, and determining interface element type corresponding to the interface element control, wherein different interface element types correspond to different interface element control types, and the interface element control types comprise at least one of: a text list, a button, a switch, and a slider;
in response to determining that a same interface element control type comprises a first type of control operation recommended by the terminal, creating a haptic effect for the first type of control operation;
in response to determining that the same interface element control type comprises a second type of control operation other than the first type, creating a haptic effect for the second type of control operation, wherein the first type of control operation comprises a user touching an unread message list of a communication chat application control, and the second type of control operation comprises the user touching a read message list of the communication chat application control; and a vibration level of the haptic effect corresponding to the first type of control operation is higher than a vibration level of the haptic effect corresponding to the second type of control operation, thereby informing the user of existence of unread messages in a communication chat software at earliest time possible;

in response to an interface element on a display interface of a terminal being touched, determining a first interface element type corresponding to the interface element;

determining, based on the matchup between the interface element types and the haptic effects, a first haptic effect corresponding to the first interface element type, wherein different interface element types correspond to different haptic effects; and generating a haptic feedback matching the first haptic effect.

10. The non-transitory computer-readable storage medium according to claim 9, wherein the terminal comprises a signal actuator, and the generating a haptic feedback matching the first haptic effect comprises:

calling, based on the first haptic effect, a first haptic effect signal corresponding to the first haptic effect in a haptic effect signal database; and controlling, based on the first haptic effect signal, the signal actuator to generate the haptic feedback matching the first haptic effect.

11. The non-transitory computer-readable storage medium according to claim 9, wherein prior to the determining a first interface element type corresponding to the interface element, the method further comprises:

determining that the terminal is in a first operation mode, wherein the first operation mode is an operation mode that is allowed to generate the haptic feedback.

* * * * *